United States Patent [19]
Sherman

[11] Patent Number: 5,211,729
[45] Date of Patent: May 18, 1993

[54] BAFFLE/SETTLING CHAMBER FOR A CHEMICAL VAPOR DEPOSITION EQUIPMENT

[75] Inventor: Robert C. Sherman, Austin, Tex.

[73] Assignee: Sematech, Inc., Austin, Tex.

[21] Appl. No.: 752,392

[22] Filed: Aug. 30, 1991

[51] Int. Cl.⁵ .............................................. B01D 19/00
[52] U.S. Cl. ........................................ 55/186; 55/201; 55/319; 55/462; 118/326
[58] Field of Search ................... 55/185, 186, 199, 201, 55/202, 319, 442–444, 462, DIG. 46; 118/326

[56] References Cited

U.S. PATENT DOCUMENTS

| | | | |
|---|---|---|---|
| 3,212,234 | 10/1965 | McMinn | 55/185 X |
| 3,250,263 | 5/1966 | Gerjets | 55/442 X |
| 4,113,454 | 9/1978 | Cvacho | 55/319 |
| 4,539,023 | 9/1985 | Boley | 55/186 X |
| 4,717,404 | 1/1988 | Fore | 55/444 |
| 4,881,952 | 11/1989 | Masaru | 118/326 X |

Primary Examiner—Charles Hart
Attorney, Agent, or Firm—William W. Kidd

[57] ABSTRACT

A baffle/settling chamber removes solid particulates from the exhaust of a semiconductor deposition equipment while reducing pressure fluctuation in the exhaust to provide a more uniform deposition of chemicals. A container having an inlet baffle plate, an outlet baffle plate and three settling plates disposed there between are disposed in a chamber and reside serially in the exhaust flow.

10 Claims, 3 Drawing Sheets

BAFFLE/SETTLING CHAMBER FOR A CHEMICAL VAPOR DEPOSITION EQUIPMENT

BACKGROUND OF THE INVENTION

1 Field of the Invention

The present invention relates to the field of semiconductor wafer processing equipment and, particularly, for use in conjunction with a chemical vapor deposition equipment.

2. Prior Art

In the manufacture of semiconductor integrated circuits, various wafer processing equipment are utilized to fabricate integrated circuit devices on a semiconductor wafer. One such equipment is the deposition machine which is used to deposit one or more of a variety of layers onto the wafer during its fabrication. A variety of deposition equipment are available for depositing such layers as dielectric, metal and polysilicon. One class of such deposition equipment utilizes a chemical vapor deposition (CVD) process to deposit a particular layer onto the wafer. It is preferred that the deposition layer be deposited uniformly onto the wafer.

One particular uniformity problem encountered in depositing a given layer onto the wafer results from pressure fluctuations existing in the exhaust system. That is, during the deposition process, many of the tightly controlled parameters of the equipment are defeated simply due to the fluctuations experienced by the equipment in the exhaust system. This fluctuation is primarily due to the exhaust system of the equipment being coupled to an exhaust system of the semiconductor fabrication plant. Such fluctuations in the exhaust system is further pronounced, if the equipment utilizes an atmospheric pressure chemical vapor deposition (APCVD) process.

Furthermore, during the reaction process, reactive plasma is typically converted to solid particulates which enter the exhaust line of the exhaust system. The particulates tend to adhere to the internal surface of the exhaust system. The trapped solid particulate residue will continue to build in the exhaust lines, posing not only a potential fire hazard, but a long term maintenance problem for the exhaust system. Extensive periodic cleaning is usually required in order to maintain a sufficiently clean exhaust system.

SUMMARY OF THE INVENTION

A baffle and settling chamber apparatus for collecting solid particulates from the exhaust of semiconductor deposition equipment while reducing pressure fluctuations to provide a more uniform deposition of chemicals is described. The apparatus is a rectangular "box-shaped" container having an inlet opening at one end and an outlet opening at its opposite end. An angled baffle plate is disposed adjacent to each opening in order to deflect the flow of gas. A plurality of perforated settling plates are disposed in parallel to restrict the flow of gas through the chamber of the apparatus.

The increased volume encountered by the exhaust gas entering the chamber of the apparatus in combination with the settling plates reduce the exhaust fluctuations caused by high kinetic energy pulses. This reduces the exhaust pressure fluctuations, thereby improving the uniformity of the deposition.

The increased volume of the chamber in combination with the baffle plates causes larger particles to be trapped in the chamber. This particulate residue "build-up" is confined primarily in the apparatus and a section of the exhaust line prior to the apparatus, thus improving the maintenance cycle for most of the exhaust line "down stream" from the apparatus.

DETAILED DESCRIPTION OF THE PREFERRED EMBODIMENTS

The present invention describes an apparatus for removing solid particulates in the exhaust and for reducing exhaust pressure fluctuations in a semiconductor processing equipment. In the following description numerous specific details are set forth, such as specific structure, shape, material, etc., in order to provide a thorough understanding of the present invention. It will be obvious, however, to one skilled in the art that the present invention may be practiced without these specific details. In other instances well-known methods and structures have not been set forth in order not to unnecessarily obscure the present invention.

Prior Art

Figure 1:
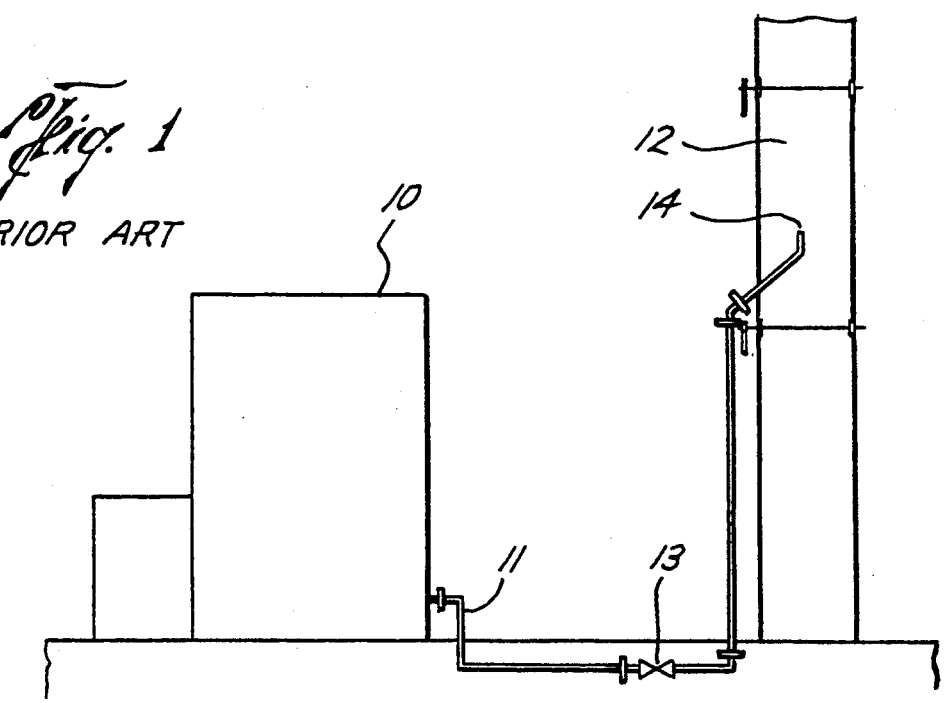
FIG. 1 shows a prior art exhaust system utilized with a APCVD equipment.

Referring to FIG. 1, a prior art exhaust system is shown. A chemical vapor deposition (CVD) equipment 10 is used to provide a CVD process for depositing a particular layer onto a semiconductor wafer, typically a silicon wafer. The particular prior art equipment shown is an atmospheric pressure chemical vapor deposition (APCVD) equipment, having a model number WJ-999-4 and manufactured by Watkins-Johnson Company of Scotts Valley, Calif. This particular equipment is utilized to provide APCVD process to deposit a dielectric layer onto a silicon wafer, one such dielectric layer being a borophosphosilicate glass (BPSG) film. In the WJ-999-4 equipment, incoming gases are introduced through an injector to deposit the BPSG film onto a substrate. The deposition process occurs at atmospheric pressure and the exhaust is vented to an atmospheric pressure exhaust system.

As shown in FIG. 1, the exhaust from the APCVD equipment 10 is coupled to an exhaust pipe (or line) 11 which is terminated within an exhaust stack 12. An exhaust throttling valve 13 is placed in-line to the exhaust line 11 to operate as a throttle in controlling the exhaust flow and pressure from equipment 10 to exhaust stack 12.

In actual use, equipment 10 typically resides on the floor of a "cleanroom" of an integrated circuit manufacturing plant. The exhaust pipe, upon exiting equipment 10, is routed beneath the cleanroom floor in a "sub-area" typically reserved for routing of such piping, as well as other system services. At some point remote from equipment 10 and exterior of the cleanroom environment, pipe 11 is routed upward and its end 14 is terminated within the exhaust stack 12. Exhaust stack 12 is of sufficient height such that it operates as a chimney for exhausting the exhaust gas from equipment 10.

Two significant problems are encountered with the prior art system of FIG. 1. Because in most instances, the exhaust stack 12 is part of a primary exhaust system for a semiconductor fabrication plant, the pressure encountered within stack 12 is typically not constant. Pressure fluctuations within stack 12 will necessarily cause the exhaust pressure from equipment 10 to also be non-uniform. If such pressure and exhaust gas flow fluctuations are present, as is usually the case with plant exhaust systems, it can cause or aid in the non-uniform deposition of a layer onto the wafer. Such non-uniformity can result in unpredictable, and sometimes undesirable, formation of a deposited layer on the wafer.

In addition, during the reaction process, reacted plasma in the processing chamber of the equipment 10 is converted to solid particulates, which may build as residue within exhaust line 11. Such particulate residue "build-up" in the exhaust line 11 can cause further fluctuations of the exhaust pressure, as well as providing a potential fire hazard. In order to alleviate this problem, periodic maintenance is required in order to clean the interior of the exhaust line 11. In most instances, the complete exhaust line 11 from equipment 10 to end 14 will require cleaning to remove the particulate residue. Typically, this maintenance procedure requires the dismantling of sections of exhaust line 11, either for cleaning or replacement. Such periodic maintenance necessarily requires significant "down time" of equipment 10, which impacts the operational flow of the fabrication plant.

Thus, it is appreciated that an exhaust system which could remove such atmospheric pressure fluctuations, while not having such particulate residue build-up, would necessarily provide for a more uniform deposition of chemicals onto the wafer, as well as providing for a reduction in the "down time" of the equipment. The present invention provides for such an improvement.

Present Invention

Figure 2:
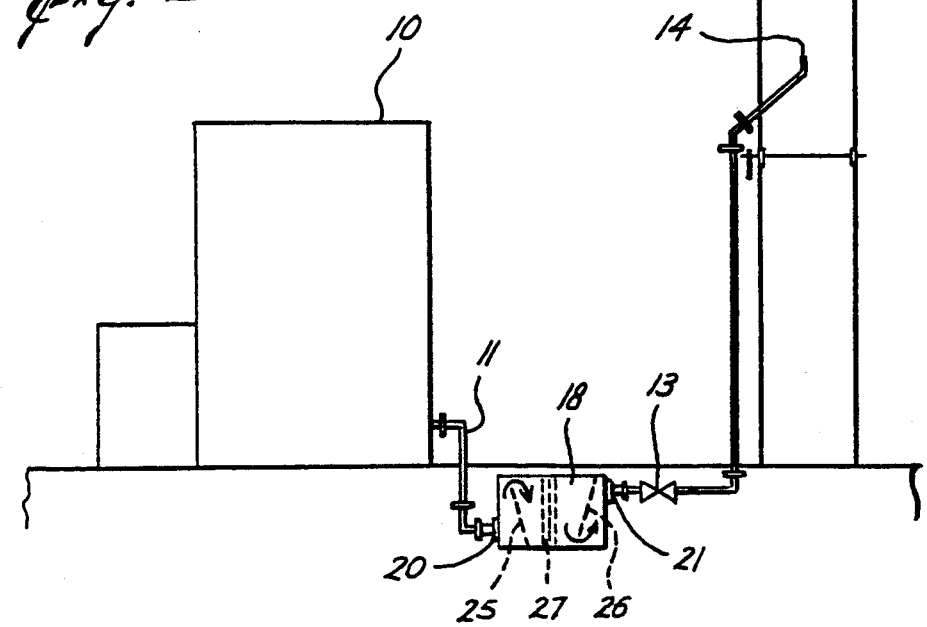
FIG. 2 shows the exhaust system of FIG. 1 but with the inclusion of the apparatus of the present invention in the exhaust line.
Figure 3:
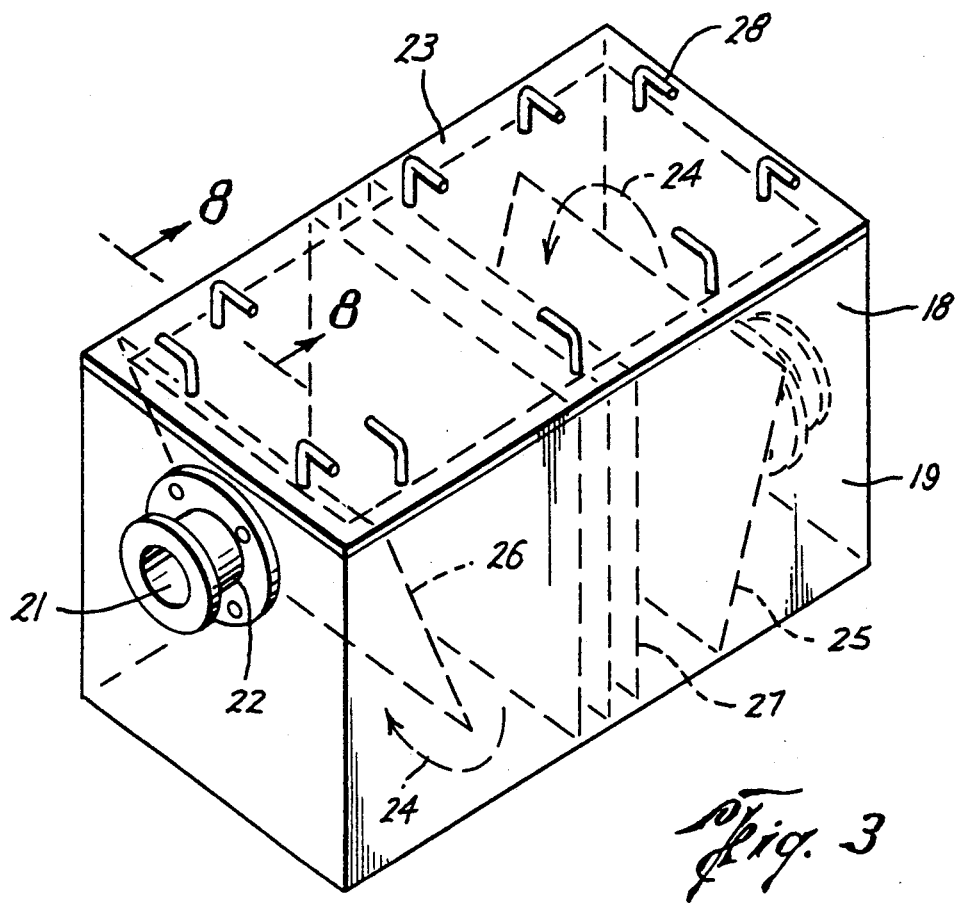
FIG. 3 is an illustration of the baffle/settling chamber apparatus of the present invention.
Figure 4:
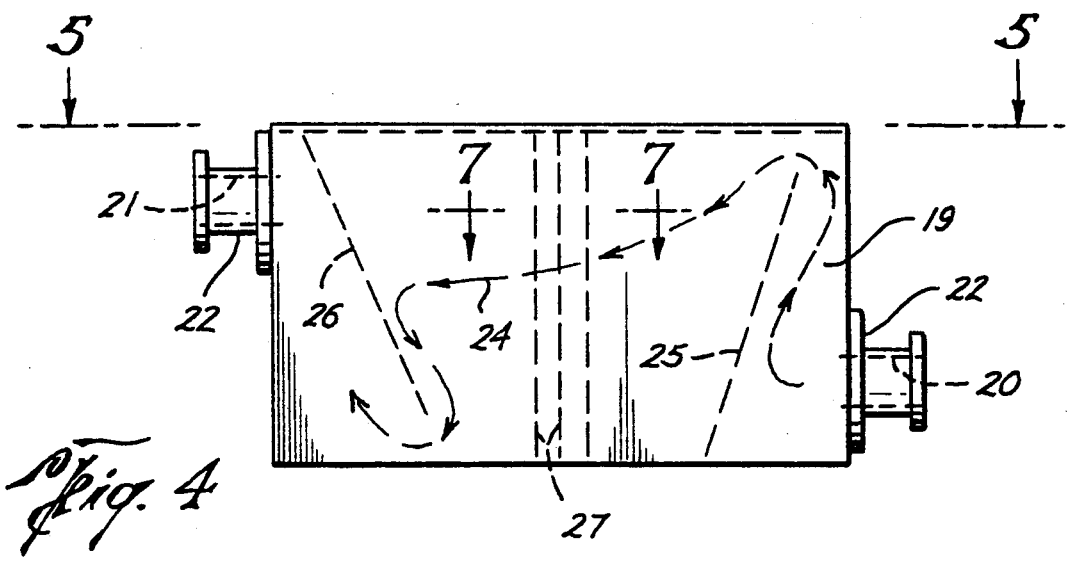
FIG. 4 is a front plan view of the apparatus of the present invention.
Figure 5:
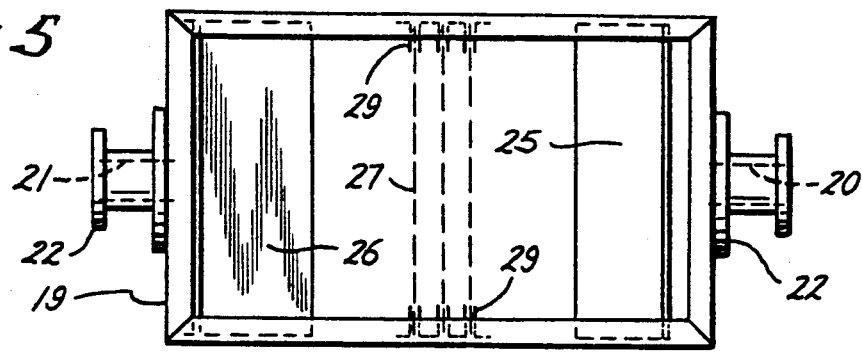
FIG. 5 is a top plan view of the apparatus of the present invention.
Figure 6:
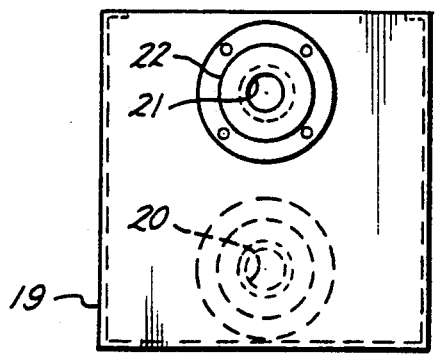
FIG. 6 is a side plan view of the apparatus of the present invention.
Figure 7:
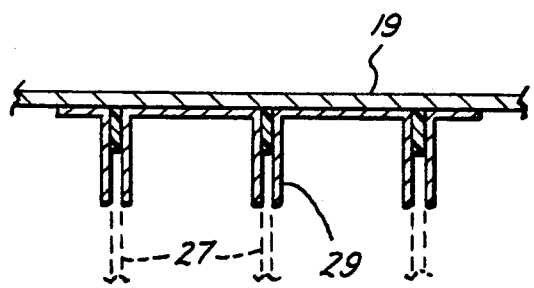
FIG. 7 shows a portion of plate guides used with the apparatus of the present invention.
Figure 8:
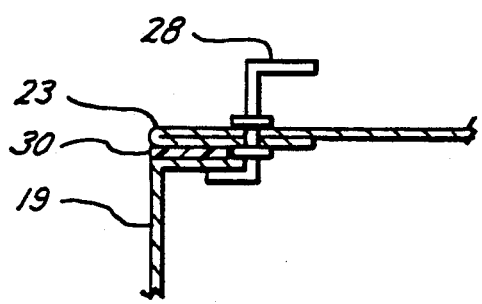
FIG. 8 is a cross-sectional view showing one of the locking levers used to clamp a top cover.

Referring to FIG. 2, the same Watkins-Johnson WJ -999-4 deposition equipment 10 for use in APCVD process for depositing a dielectric layer is shown having an exhaust system, which includes exhaust line 11 terrminating at end 14 for exhaust into the exhaust stack 12. The exhaust throttling valve 13 is also incorporated in series to the exhaust line 11. This configuration is equivalent to the exhaust system configuration of FIG. 1. However, unlike the prior art exhaust system of FIG. 1, a baffle/settling apparatus 18 of the present invention is also inserted in series to exhaust line 11. Apparatus 18 is a "box-shaped" container for providing a baffle/settling chamber within the container. Apparatus 18 is disposed serially ("in-line") to the exhaust line 11. In practice, the prior art system of FIG. 1 is modified by having the apparatus 18 inserted into the exhaust line 11. Exhaust line 11 will necessarily require cutting and/or addition of fittings to accommodate the apparatus 18. Furthermore, it is preferred to position the apparatus proximal to equipment 10, but in an unobtrusive location such as in the "sub-area" of the fab.

The apparatus 18 of the preferred embodiment is shown in more detail in FIGS. 3-8. Apparatus 18 is encased in a rectangular "boxed-shaped" container 19 having a inlet opening 20 at one end and an outlet opening 21 at its opposite end. Fittings 22 are utilized at these openings 20 and 21 for coupling container 19 to exhaust line 11. In the preferred embodiment, vacuum flanges are used for fittings 22. Inlet opening 20 is coupled to a section of the exhaust line from equipment 10. Outlet opening 21 is coupled to a section of the exhaust line coupled to exhaust stack 12. As noted in FIG. 2, the throttling valve 13 is coupled serially "in-line" between outlet 21 and opening 14 of exhaust line 11.

In its upright position, apparatus 18 has a removable top cover 23 which permits access to the interior of container 19 when cover 23 is removed. Disposed within container 19 are an influent baffle plate 25 and an effluent baffle plate 26. As is shown in detail in FIG. 4, the influent baffle plate 25 is located proximate to inlet opening 20, which opening 20 is nearer to the bottom of the container 19. Plate 25 is disposed to reside on the bottom surface of container 19, having its upper end angled slightly (approximately 15 degrees from vertical) toward the inlet opening 20. The effluent baffle plate 26 is located proximal to the outlet opening 21 and nearer to the top of container 19. Since the outlet opening 21 is disposed closer to the upper end of container 19, the effluent baffle plate 26 is disposed to reside against the top cover 21 and its lower end angled slightly (approximately 15 degrees from vertical) from normal away from opening 21.

A plurality of settling plates 27 are positioned near the center of the container 19 and extending the full width and height of the interior of container 19. The plates 27 are positioned in parallel and spaced apart from each other by separator guides 29 shown in FIG. 7. Although three settling plates 27 are shown, the actual number of plates 27 which can be utilized is a design choice. Furthermore, although a variety of schemes are available for the placement of various plates 25-27, the apparatus 18 of the present invention utilizes guides for retaining these plates 25-27 at their respective positions.

As is practiced with the container 19 of the present invention plates 25 and 26 are solid plates while settling plates 27 are perforated to have open areas for the passage of exhaust gases. The amount of the open perforation as a percentage of the total surface area for each plate 27 is a design choice. More open the perforation for a given plate 27, lesser the restriction of the gas flowing through container 19. In the preferred embodiment all three plates are designed to have a perforation of 50 percent, wherein a screen mesh is used to form plates 27 to obtain the perforations.

In operation, the exhaust gas from equipment 10 enters container 19 through inlet opening 20. The entering gas immediately encounters a difference in the volume upon entering container 19. At this point, the entering gas encounters the influent baffle plate 25 and is forced upward toward the cover plate 23. Upon approaching cover plate 23, the upper edge of the influent plate 25 is encountered and the entering gas proceeds past the open area between the upper end of plate 25 and cover 23.

Subsequently, the gas encounters the series of settling plates 27 wherein the gas passes through the perforated openings and encounters effluent plate 26. The only area available for gas passage at the effluent end of container 19 is the open area between the end of effluent plate 26 and the bottom surface of container 19. The gas, after traversing past plate 26 is exhausted through outlet opening 21. The gas passage across container 19 is illustrated by arrows 24 in FIG. 4.

The apparatus 18 provides for two advantages over the prior art exhaust system. The exhaust fluctuation encountered in the prior art system are reduced significantly by the reduction of the high kinetic energy exhaust pulses which are encountered in the exhaust line of the prior art system. The cross-sectional flow area provided by the expanded volume of container 19 in combination with the flow restriction provided by the settling plates 27 operate to reduce the high kinetic energy pulses. The high kinetic energy pulsations are inhibited in order to maintain a more uniform exhaust pressure at equipment 10, in order to reduce the non-uniformity deposition problem encountered in the prior art.

Secondly, the increased cross-sectional flow area of container 19, coupled with the presence of the baffle plates 25 and 26, aid in the removal of particulates in the exhaust line 11. The cross-sectional flow area causes a reduction in the particulate transport velocities for the gas and removes a significant amount of solid particulates. That is, it is well known that solid particulates have transport velocities which are determined by the mass of the particle. When the actual velocity is reduced, such is the case when the exhaust gas enters container 19, a significant amount of the particles will drop to the bottom of the container 19 since the actual gas velocity is less than the transport velocity of those particles.

Furthermore, the impingement of various particulates against plates 25 and 26 as the particles traverse through apparatus 18, causes additional particles to adhere to the plates 25 and 26 or drop to the bottom of the container 19. As is noted in the drawings, the plates 25 and 26 are angled against the flow of the gas through container 19, such that the impinging particles must overcome this physical gradient in order to traverse across container 19. The inlet opening 20 is located nearer to the bottom of container 19 while the outlet opening 21 is located neared to the top of container 19. The respective locations are for the purpose of increasing the travel distance between the opening 20 or 21 and the open edge of the corresponding baffle plate 25 and 26. Although it may be difficult or even impossible to remove every particulate, a significant percentage, and especially the larger particulates, will be trapped in the container 19.

When maintenance is required to the exhaust system of FIG. 2, most of the particulates reaching apparatus 18 are trapped and retained within container 19. As is noted in FIG. 8, the cover can be readily removed by turning the lever clamps 28 to remove cover plate 23. Cover plate 23 seals container 19 by the use of a gasket 30 and locked in position by clamps 29. It is to be noted that a variety of gasket materials can be used.

After the cover 23 is removed, the plates 25-27, which are removable, are pulled upward and out of container 19. The interior of the container can now be cleaned. The plates 25-27 can be cleaned and replaced or alternatively new plates can be inserted into container 19. Thus, because apparatus 18 traps most of the solid particulates reaching it, the residual buildup occurs within container 19 and the short section of exhaust line between equipment 10 and container 19. This section can be either cleaned or readily replaced.

In most instances, it is preferred that apparatus 18 be disposed proximal to equipment 10 thereby minimizing the length of the section of the exhaust line between equipment 10 and container 19. The main portion of the exhaust line 11 will then be located between the outlet opening 21 of container 19 and opening 14 at the exhaust stack 12. This significantly longer segment of the exhaust line 11 will not require the number of cleanings as was required in the prior art, since the particulate buildup in this section of the line 11 is reduced significantly due to the presence of apparatus 18. Typically, the shorter section of line 11 between the equipment 10 and apparatus 18 is easily accessible for maintenance as compared to the segment past the apparatus 18.

In the preferred embodiment the container 19 and the plates 25-27 are fabricated from stainless steel and a silicon gasket 30 is used as the sealant for sealing cover 23 onto container 19. Fittings 22 are also constructed of stainless steel.

Thus, by the insertion of the apparatus 18 of the present invention serially in the exhaust line 11, exhaust fluctuations are reduced to provide a more constant exhaust pressure for providing a more uniform deposition of chemicals. Furthermore, the solid particulates are collected within container 18, thereby reducing the required maintenance to the complete exhaust system. It is appreciated that the apparatus, although described for use with an APCVD equipment, can be readily used with other CVD equipment, as well as other processing equipment which require exhaust systems. However, the more efficient usage of the apparatus of the present invention is its use with an APCVD equipment. Furthermore, it is appreciated that the apparatus can be readily designed into the exhaust system as part of the APCVD equipment.

I claim

1. In combination for use with a semiconductor processing equipment having its exhaust coupled to an exhaust system, an apparatus for reducing pressure fluctuations of said exhaust and trapping solid particulates present in said exhaust comprising:
   an enclosed container, having an inlet opening coupled to receive sad exhaust from said semiconductor processing equipment and an outlet opening coupled to said exhaust system, for providing an enlarged chamber having an increased cross-sectional flow area to expand the volume of exhaust gas from said equipment in order to reduce exhaust gas velocity while in said container, such that said reduced gas velocity is less than transport velocities of larger of said solid particulates, wherein causing said larger of said solid particulates to fall to the bottom of said container and trapped therein;
   an influent baffle plate disposed in said container proximal to said inlet opening for providing a barrier to said exhaust gas entering said inlet opening, such that some of said solid particulates present in said exhaust gas impinge on said influent baffle plate and are trapped in said container;
   an effluent baffle plate disposed in said container proximal to said outlet opening for providing additional barrier to said exhaust gas traversing said container and exiting said outlet opening, such that solid particulates still present in said exhaust gas impinge on sad effluent baffle plate and are trapped in said container;

a plurality of perforated settling plates disposed in said container between said influent and effluent baffle plates for providing some restriction to the flow of said exhaust gas through said container, wherein sad settling plates further trap additional solid particulates traversing across said chamber said increased cross-sectional flow area of said container and said settling plates also functioning to dampen kinetic energy pluses of said exhaust system in order to reduce pressure fluctuations of said exhaust.

2. The apparatus of claim 1 wherein said settling plates are fabricated to form a screen mesh and in which said settling plates are disposed in parallel against the flow of said exhaust gas across said chamber.

3. The apparatus of claim 2 wherein said influent and effluent baffle plates are angled against the flow of said exhaust gas across said chamber.

4. The apparatus of claim 3 wherein all of said plates and said container are fabricated from stainless steel.

5. In combination for use with a semiconductor chemical vapor deposition (CVD) equipment having its exhaust coupled to an exhaust system, an apparatus for insertion in said exhaust system for reducing pressure fluctuations of said exhaust and trapping solid particulates present in said exhaust comprising:

an enclosed container, having an inlet opening coupled to receive said exhaust from said semiconductor CVD equipment and an outlet opening coupled to an outlet of said exhaust system, for providing an enlarged chamber having an increased cross-sectional flow area to expand the volume of exhaust gas from said equipment in order to reduce exhaust gas velocity while in said container, such that said reduced gas velocity is less than transport velocities of larger of said solid particulates, wherein causing said larger of said solid particulates to fall to the bottom of said container and trapped therein;

an influent baffle plate disposed in said container proximal to said inlet opening for providing a first partial barrier to said exhaust gas entering said inlet opening, such that some of said solid particulates present in said exhaust gas entering said container impinge on said influent baffle plate and are trapped in said container;

an effluent baffle plate disposed in said container proximal to said outlet opening for providing a second partial barrier to said exhaust gas traversing said container and exiting said outlet opening, such that solid particulates still present in said exhaust gas impinge on said effluent baffle plate and are trapped in said container;

a plurality of perforated settling plates disposed in parallel in said container between said influent and effluent baffle plates for providing some restriction to the flow of said exhaust gas through said container, wherein said settling plates further trap additional solid particulates traversing across said chamber said increased cross-sectional flow area of said container and said settling plates also functioning to dampen kinetic energy pulses of said exhaust system in order to reduce pressure fluctuations of said exhaust for improved CVD deposition uniformity.

6. The apparatus of claim 5 wherein said CVD equipment is an atmospheric pressure chemical vapor deposition (APCVD) equipment.

7. The apparatus of claim 6 wherein said influent and effluent baffle plates are angled against the flow of said exhaust gas.

8.. The apparatus of claim 7 wherein settling plates are fabricated to form a screen mesh.

9. The apparatus of claim 8 wherein all of said plates and said container are fabricated from stainless steel.

10. The apparatus of claim 9 wherein said container is a rectangularly-shaped box having a removable top cover and wherein said inlet opening is at one end and said outlet opening is at its opposite end.

* * * * *

UNITED STATES PATENT AND TRADEMARK OFFICE
CERTIFICATE OF CORRECTION

PATENT NO. : 5,211,729
DATED : May 18, 1993
INVENTOR(S) : Robert C. Sherman

It is certified that error appears in the above-identified patent and that said Letters Patent is hereby corrected as shown below:

Column 7, line 7, "sad" should be --said--

Signed and Sealed this

Twenty-eighth Day of June, 1994

Attest:

BRUCE LEHMAN

Attesting Officer

Commissioner of Patents and Trademarks